US011971746B2

(12) United States Patent
Wang et al.

(10) Patent No.: US 11,971,746 B2
(45) Date of Patent: Apr. 30, 2024

(54) EXPANDABLE RING DEVICE

(71) Applicant: Apple Inc., Cupertino, CA (US)

(72) Inventors: Paul X. Wang, Cupertino, CA (US);
Dinesh C. Mathew, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 16/938,048

(22) Filed: Jul. 24, 2020

(65) Prior Publication Data
US 2020/0356137 A1   Nov. 12, 2020

Related U.S. Application Data

(63) Continuation of application No. 16/745,747, filed on Jan. 17, 2020, now Pat. No. 10,739,820, which is a continuation of application No. 16/270,497, filed on Feb. 7, 2019, now Pat. No. 10,579,099.

(60) Provisional application No. 62/664,809, filed on Apr. 30, 2018.

(51) Int. Cl.
*G06F 1/16*        (2006.01)
*G06F 3/01*        (2006.01)
*G06F 3/044*       (2006.01)

(52) U.S. Cl.
CPC .............. *G06F 1/163* (2013.01); *G06F 3/014* (2013.01); *G06F 3/016* (2013.01); *G06F 3/044* (2013.01); *G06F 2203/0331* (2013.01)

(58) Field of Classification Search
CPC .......... G06F 1/163; G06F 3/014; G06F 3/044; G06F 3/016; G06F 2203/0331; G06F 3/011
See application file for complete search history.

(56) References Cited

U.S. PATENT DOCUMENTS

| 4,911,683 A | 3/1990 | Legge et al. |
| 4,988,981 A | 1/1991 | Zimmerman et al. |
| 5,242,440 A * | 9/1993 | Shippert ................ A61B 17/00 |
| | | 200/DIG. 2 |

(Continued)

FOREIGN PATENT DOCUMENTS

| CN | 104622613 A | 5/2015 |
| CN | 206586511 U | 10/2017 |

(Continued)

*Primary Examiner* — Lisa Lea-Edmonds
(74) *Attorney, Agent, or Firm* — Treyz Law Group, P.C.; G. Victor Treyz; David K. Cole

(57) ABSTRACT

A system may include ring devices. A ring device may have a housing that is configured to be worn on a finger of a user. Sensors such as force sensors, ultrasonic sensors, inertial measurement units, optical sensors, touch sensors, and other components may be used in gathering input from a user. Control circuitry may wirelessly transmit information gathered from sensors and other input devices to an associated electronic device. The information may be used in controlling operation of the electronic device. The housing of the ring device may have an annular main body and an expandable portion coupled to the main body. The expandable portion may include a flap with a hinge, a rotatable housing member, a housing with an internal adjustable frame and a cover, an expandable housing formed from an expandable tube coupled between first and second annular devices, and other expandable structures.

20 Claims, 20 Drawing Sheets

(56) References Cited

U.S. PATENT DOCUMENTS

| | | | |
|---|---|---|---|
| 5,354,162 A | 10/1994 | Burdea et al. | |
| 5,481,265 A | 1/1996 | Russell | |
| 5,489,922 A | 2/1996 | Zloof | |
| 6,853,293 B2* | 2/2005 | Swartz | G06F 1/163 235/462.15 |
| 7,042,438 B2 | 5/2006 | McRae et al. | |
| 8,031,172 B2* | 10/2011 | Kruse | G06F 3/014 345/156 |
| 8,086,971 B2 | 12/2011 | Radivojevic et al. | |
| 8,179,604 B1* | 5/2012 | Prada Gomez | G02B 27/0093 359/630 |
| 8,405,612 B2 | 3/2013 | Kruse et al. | |
| 8,570,273 B1* | 10/2013 | Smith | G06F 3/03547 345/156 |
| 8,872,729 B2* | 10/2014 | Lyons | G06F 1/1641 345/1.1 |
| 9,329,689 B2* | 5/2016 | Osterhout | G02B 27/017 |
| 9,329,716 B2 | 5/2016 | Parham | |
| 9,335,790 B2* | 5/2016 | Stotler | G06F 1/1626 |
| 9,367,139 B2 | 6/2016 | Ataee et al. | |
| 9,477,146 B2 | 10/2016 | Xu et al. | |
| 9,535,516 B2 | 1/2017 | Parham | |
| 9,600,030 B2 | 3/2017 | Bailey et al. | |
| 9,606,654 B2 | 3/2017 | Li | |
| 9,651,992 B2 | 5/2017 | Stotler | |
| 9,658,692 B1* | 5/2017 | Keyes | G06F 1/163 |
| 9,696,690 B2 | 7/2017 | Nguyen et al. | |
| 9,696,822 B2 | 7/2017 | Dow et al. | |
| 9,746,921 B2* | 8/2017 | Mallinson | A63F 13/5255 |
| 9,891,718 B2* | 2/2018 | Connor | A61B 5/389 |
| 9,955,286 B2 | 4/2018 | Segal | |
| 10,037,052 B2 | 7/2018 | Stotler | |
| 10,082,829 B2 | 9/2018 | Kuwabara et al. | |
| 10,095,309 B2 | 10/2018 | Chen et al. | |
| 10,139,906 B1* | 11/2018 | Bai | G06F 3/017 |
| 10,152,082 B2 | 12/2018 | Bailey | |
| 10,191,574 B2* | 1/2019 | Shin | H04M 1/0268 |
| 10,225,721 B2 | 3/2019 | Segal | |
| 10,241,573 B2 | 3/2019 | Mallinson | |
| 10,317,940 B2* | 6/2019 | Eim | H04M 1/0235 |
| 10,347,144 B2* | 7/2019 | Subiakto | G09B 19/00 |
| 10,359,787 B2 | 7/2019 | Chen | |
| 10,539,787 B2* | 1/2020 | Haddick | G02B 27/0093 |
| 10,656,822 B2* | 5/2020 | Bailey | G02B 27/0176 |
| 10,795,438 B2* | 10/2020 | Wang | G06F 3/016 |
| 2002/0163495 A1 | 11/2002 | Doynov | |
| 2003/0025721 A1 | 2/2003 | Clapper et al. | |
| 2003/0214481 A1 | 11/2003 | Xiong | |
| 2006/0012567 A1 | 1/2006 | Sicklinger | |
| 2007/0030246 A1 | 2/2007 | Tremblay et al. | |
| 2008/0058622 A1* | 3/2008 | Baker | A61B 5/14552 600/344 |
| 2009/0096746 A1* | 4/2009 | Kruse | G06F 3/017 345/156 |
| 2009/0153365 A1 | 6/2009 | Salsedo et al. | |
| 2010/0168531 A1* | 7/2010 | Shaltis | A61B 5/02241 600/301 |
| 2010/0188326 A1* | 7/2010 | Dines | G06F 3/014 345/156 |
| 2011/0007035 A1* | 1/2011 | Shai | G06F 3/0338 345/179 |
| 2012/0075173 A1 | 3/2012 | Ashbrook et al. | |
| 2014/0267183 A1* | 9/2014 | Branch | G06F 3/03545 345/179 |
| 2015/0051470 A1 | 2/2015 | Bailey et al. | |
| 2015/0062086 A1 | 3/2015 | Nattukallingal | |
| 2015/0077347 A1* | 3/2015 | O'Green | G06F 3/0383 345/173 |
| 2015/0277559 A1* | 10/2015 | Vescovi | G06F 1/163 345/173 |
| 2016/0004300 A1* | 1/2016 | Baic | G06F 3/017 345/419 |
| 2016/0018890 A1* | 1/2016 | Deokar | G06F 3/016 715/702 |
| 2016/0116941 A1* | 4/2016 | Kuwabara | G06F 1/163 361/679.03 |
| 2016/0179210 A1* | 6/2016 | Sakai | G06F 3/017 345/156 |
| 2016/0209920 A1 | 7/2016 | Mastandrea | |
| 2016/0292563 A1* | 10/2016 | Park | G06F 3/04883 |
| 2017/0038897 A1 | 2/2017 | Park et al. | |
| 2017/0083115 A1* | 3/2017 | Speck | G06T 17/205 |
| 2017/0123510 A1 | 5/2017 | Parham | |
| 2017/0147033 A1* | 5/2017 | Pastorino | G06F 3/0362 |
| 2017/0205879 A1 | 7/2017 | Joseph et al. | |
| 2017/0262085 A1 | 9/2017 | Askew | |
| 2017/0277138 A1 | 9/2017 | Kaji et al. | |
| 2017/0351345 A1* | 12/2017 | Nirjon | G06F 3/014 |
| 2017/0364151 A1* | 12/2017 | Huang | G06F 3/033 |
| 2018/0101289 A1* | 4/2018 | Bailey | G06F 1/163 |
| 2018/0267606 A1 | 9/2018 | Huang | |
| 2018/0373332 A1 | 12/2018 | Keller et al. | |
| 2019/0129676 A1* | 5/2019 | Lake | G06F 3/011 |
| 2019/0130396 A1* | 5/2019 | Elangovan | G06F 3/014 |
| 2019/0155385 A1 | 5/2019 | Lim et al. | |
| 2019/0265781 A1* | 8/2019 | Kehoe | G06F 1/1686 |
| 2019/0294261 A1* | 9/2019 | Lohse | G06F 3/0325 |
| 2019/0310706 A1* | 10/2019 | Wang | H02J 7/32 |
| 2019/0313367 A1* | 10/2019 | Ryu | H04M 19/04 |

FOREIGN PATENT DOCUMENTS

| | | |
|---|---|---|
| CN | 107678542 A | 2/2018 |
| EP | 3291045 A1 | 3/2018 |

\* cited by examiner

EXPANDABLE RING DEVICE

This application is a continuation of U.S. patent application Ser. No. 16/745,747, filed Jan. 17, 2020, which is a continuation of U.S. patent application Ser. No. 16/270,497, filed Feb. 7, 2019, now U.S. Pat. No. 10,579,099, which claims priority to U.S. provisional patent application No. 62/664,809, filed Apr. 30, 2018, which are hereby incorporated by reference herein in their entireties.

FIELD

This relates generally to electronic devices, and, more particularly, to ring devices.

BACKGROUND

Electronic devices such as computers can be controlled using computer mice and other input accessories. In virtual reality systems, force-feedback gloves can be used to control virtual objects. Cellular telephones may have touch screen displays and vibrators that are used to create haptic feedback in response to touch input.

Devices such as these may not be convenient for a user, may be cumbersome or uncomfortable, or may provide inadequate feedback.

SUMMARY

A system may include ring devices and electronic equipment that can be controlled using the ring devices.

A ring device may have a housing that is configured to be worn on a finger of a user. Sensors in the housing such as force sensors, ultrasonic sensors, inertial measurement units, optical sensors, touch sensors, and other components in the ring devices may be used in gathering input from a user. During operation, haptic output can be provided to the finger of a user using a haptic output device in the housing. Control circuitry in the housing may wirelessly transmit information gathered from the sensors and other input devices to associated electronic devices in the system. The information may include control signals that control operation of the electronic devices.

The housing of the ring device may have an annular main body and an expandable portion coupled to the main body. The expandable portion may include a flap with a hinge, a rotatable housing member, expandable nested housing segments, or other housing structures that move relative to an annular housing structure on the finger of a user.

In some configurations, a ring device may have a housing with an internal adjustable frame and a cover. The internal frame may have telescoping legs. A ring device may also have an expandable housing formed from an expandable layer coupled between first and second annular housing members that can be moved apart to expand the device.

A ring device with an expandable portion can be operated in an unexpanded state in which the expandable portion is retracted and the ring device is compact and can be operated in an expanded state in which the expandable portion is deployed and the ring device is enlarged.

An expandable housing portion in a ring device may include sensors and other input devices. For example, a capacitive touch sensor or other touch sensor may be formed on an expandable portion of a ring device housing or other housing structure. In some configurations, force sensors such as strain gauges may be used in gathering user input. Strain gauge circuitry on an expandable portion may, for example, make measurements of finger bending as the ring device is being worn by a user.

If desired, rotatable buttons and other input devices may be mounted to an annular housing in a ring device.

DETAILED DESCRIPTION

Figure 1:
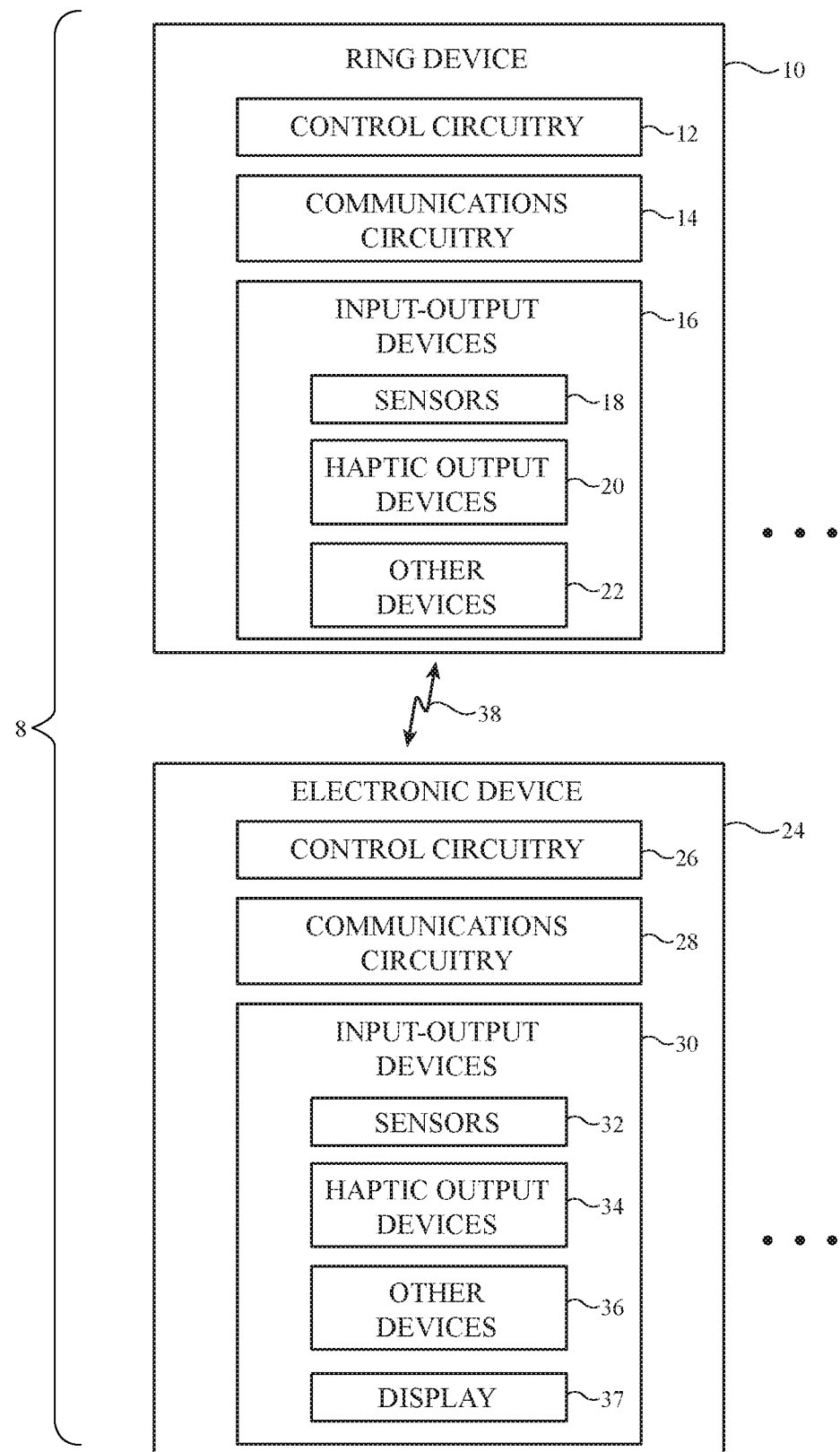
FIG. 1 is a schematic diagram of an illustrative system with a ring device such in accordance with an embodiment.

Electronic devices that are configured to be mounted on the body of a user may be used to gather user input and to provide a user with output. For example, electronic devices that are configured to be worn on one or more of a user's fingers, which are sometimes referred to as ring devices or electronic ring devices, may be used to gather user input and to supply output. A ring device may have an annular housing with a circular opening that receives a user's finger. Sensor circuitry in the ring device may allow the ring device to gather measurements on the position, orientation, and motion of the finger on which the ring device is being worn, and other finger activity information. Communications circuitry in the ring device may be used to provide sensor information to external equipment. For example, wireless circuitry may send information gathered with the ring device to one or more electronic devices wirelessly for use in controlling the electronic devices.

A ring device may, as an example, include an inertial measurement unit with an accelerometer for gathering information on figure motions such as finger taps or free-space finger gestures, may include force sensors for gathering information on normal and shear forces in the ring device and the user's finger (e.g., shear forces that arise from twisting the ring on the user's finger, normal forces that arise when tapping the surface of the ring, etc.), and may include other sensors for gathering information on the interactions between the ring device (and the user's finger on which the device is mounted) and the surrounding environment. The ring device may include a haptic output device to provide the user's finger with haptic output and may include other output components.

One or more ring devices may gather user input from a user. The user may use ring devices in operating a virtual reality or mixed reality device (e.g., head-mounted equipment such as glasses, goggles, a helmet, or other device with a display). During operation, the ring devices may gather user input such as information on interactions between the ring device(s) and the surrounding environment (e.g., interactions between a user's fingers and the environment including finger motions and other interactions associated with virtual content displayed for a user). The user input may be used in controlling visual output on the display. During operation, haptic output may be provided to the user's fingers using the ring devices. Haptic output may be used, for example, to provide the fingers of a user with vibrations for notifications, may be used to create detents as a user provides touch input to a touch sensor on the ring, and haptic feedback as the user interacts with external equipment (as examples).

Ring devices can be worn on any or all of a user's fingers (e.g., the index finger, the index finger and thumb, three of a user's fingers on one of the user's hands, some or all fingers on both hands, etc.). In some configurations, ring devices may be expandable. A ring device may, as an example, be expanded in size to enhance the functionality of the ring device by providing additional surface area for gathering touch sensor input or other sensor measurements from sensor circuitry in the expanded portions and/or other portions of the device, to allow the ring device to extend along the finger for a sufficient length that bends in the finger can be measured by a stain gauge or other bend sensor, to provide additional area to support visual markers for operation in a mixed reality system with camera-based ring tracking, and/or to otherwise enhance the capabilities of the ring device.

FIG. 1 is a schematic diagram of an illustrative system of the type that may include one or more ring devices. As shown in FIG. 1, system 8 may include electronic device(s) such as ring device(s) 10 and other electronic device(s) 24. Each ring device 10 may be worn on a finger of a user's hand. Additional electronic devices in system 8 such as devices 24 may include devices such as a laptop computer, a computer monitor containing an embedded computer, a tablet computer, a desktop computer, a cellular telephone, a media player, or other handheld or portable electronic device, a smaller device such as a wristwatch device, a pendant device, a headphone or earpiece device, a head-mounted device such as glasses, goggles, a helmet, or other equipment worn on a user's head, or other wearable or miniature device, a television, a computer display that does not contain an embedded computer, a gaming device, a remote control, a navigation device, an embedded system such as a system in which equipment is mounted in a kiosk, in an automobile, airplane, or other vehicle, a removable external case for electronic equipment, a strap, a wrist band or head band, a removable cover for a device, a case or bag that has straps or that has other structures to receive and carry electronic equipment and other items, a necklace or arm band, a wallet, sleeve, pocket, or other structure into which electronic equipment or other items may be inserted, part of a chair, sofa, or other seating (e.g., cushions or other seating structures), part of an item of clothing or other wearable item (e.g., a hat, belt, wrist band, headband, sock, glove, shirt, pants, etc.), or equipment that implements the functionality of two or more of these devices.

With one illustrative configuration, which may sometimes be described herein as an example, ring device 10 is a finger-mounted device having an annular housing with a central opening configured to receive a user's finger and device 10 interacts with one or more devices 24 such as a cellular telephone, tablet computer, laptop computer, wristwatch device, head-mounted device, a device with a speaker, or other electronic device (e.g., a device with a display, audio components, and/or other output components).

Devices 10 and 24 may include control circuitry 12 and 26. Control circuitry 12 and 26 may include storage and processing circuitry for supporting the operation of system

8. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 12 and 26 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between devices 10 and 24 and/or to support communications between equipment in system 8 and external electronic equipment, control circuitry 12 may communicate using communications circuitry 14 and/or control circuitry 26 may communicate using communications circuitry 28. Circuitry 14 and/or 28 may include antennas, radio-frequency transceiver circuitry, and other wireless communications circuitry and/or wired communications circuitry. Circuitry 14 and/or 26, which may sometimes be referred to as control circuitry and/or control and communications circuitry, may, for example, support bidirectional wireless communications between devices 10 and 24 over wireless link 38 (e.g., a wireless local area network link, a near-field communications link, or other suitable wired or wireless communications link (e.g., a Bluetooth® link, a WiFi® link, a 60 GHz link or other millimeter wave link, etc.). During operation of system 8, devices 10 and 24 may communicate wirelessly to control the operation of system 8. For example, sensor input and other input gathered using sensors and other circuitry in one or more devices 10 may be wirelessly transmitted to one or more devices 24 to control devices 24. If desired, devices 10 and 24 may also include power circuits for transmitting and/or receiving wired and/or wireless power and may include batteries. In configurations in which wireless power transfer is supported between devices 10 and 24, in-band wireless communications may be supported using inductive power transfer coils (as an example).

Devices 10 and 24 may include input-output devices such as devices 16 and 30. Input-output devices 16 and/or 30 may be used in gathering user input, in gathering information on the environment surrounding the user, and/or in providing a user with output. Devices 16 may include sensors 18 and devices 24 may include sensors 32. Sensors 18 and/or 32 may include force sensors (e.g., strain gauges, capacitive force sensors, resistive force sensors, etc.), audio sensors such as microphones, touch and/or proximity sensors such as capacitive sensors, optical sensors such as optical sensors that emit and detect light, ultrasonic sensors, and/or other touch sensors and/or proximity sensors, monochromatic and color ambient light sensors, image sensors, sensors for detecting position, orientation, and/or motion (e.g., accelerometers, magnetic sensors such as compass sensors, gyroscopes, and/or inertial measurement units that contain some or all of these sensors), muscle activity sensors (EMG) for detecting finger actions, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, optical sensors such as visual odometry sensors that gather position and/or orientation information using images gathered with digital image sensors in cameras, gaze tracking sensors, visible light and/or infrared cameras having digital image sensors, humidity sensors, moisture sensors, and/or other sensors. Capacitive sensors may include mutual-capacitance sensors and/or self-capacitance sensors. Capacitive sensors may be configured to detect direct from a finger or other external object. In this type of configuration, the capacitive sensors may sometimes be referred to as touch sensors. If desired, capacitive sensors can configured to detect the presence of a hovering finger or other nearby external object that is not directly touching the capacitive sensor. In this type of configuration, the capacitive sensors may sometimes be referred to as proximity sensors. In general, capacitive sensors in devices 10 and/or 24 may be used to gather touch input and/or proximity input. Touch input may include direct contact from a finger or other external object. Proximity input may include input from a nearby finger such as a finger that is hovering over a proximity sensor and/or moving three-dimensional finger gestures. Proximity sensor input that is gathered with a capacitive proximity sensor or other proximity sensor may also include measurements of adjacent fingers (e.g., to determine whether a user's fingers are spread out from each other or are adjacent to each other). In some arrangements, devices 10 and/or 24 may use sensors 18 and/or 32 and/or other input-output devices 16 and/or 30 to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.). If desired, device 10 and/or device 24 may include rotating buttons (e.g., a crown mechanism on a watch or ring device or other suitable rotating button (knob) that rotates and that optionally can be depressed to select items of interest). Push buttons, sliding buttons, and other buttons with mechanically moving button members may also be used. Alphanumeric keys and/or other buttons may be included in devices 16 and/or 30.

Devices 16 and/or 30 may include haptic output devices 20 and/or 34. Haptic output devices 20 and/or 34 can produce motion that is sensed by the user (e.g., through the user's fingertips). Haptic output devices 20 and/or 34 may include actuators such as electromagnetic actuators, motors, piezoelectric actuators, shape memory alloy actuators, electroactive polymer actuators, vibrators, linear actuators, rotational actuators, actuators that bend bendable members, actuator devices that create and/or control repulsive and/or attractive forces between devices 10 and/or 24 (e.g., components for creating electrostatic repulsion and/or attraction such as electrodes, components for producing ultrasonic output such as ultrasonic transducers, components for producing magnetic interactions such as electromagnets for producing direct-current and/or alternating-current magnetic fields, permanent magnets, magnetic materials such as iron or ferrite, and/or other circuitry for producing repulsive and/or attractive forces between devices 10 and/or 24). In some situations, actuators for creating forces in device 10 may be used in squeezing a user's finger and/or otherwise directly interacting with a user's finger. In other situations, these components may be used to interact with each other (e.g., by creating a dynamically adjustable electromagnetic repulsion and/or attraction force between a pair of devices 10 and/or between device(s) 10 and device(s) 24 using electromagnets).

If desired, input-output devices 16 and/or 30 may include other devices 22 and/or 36 such as status indicator lights (e.g., a light-emitting diode in device 10 and/or 24 that serves as a power indicator, and other light-based output devices), speakers and other audio output devices, electromagnets, permanent magnets, structures formed from magnetic material (e.g., iron bars or other ferromagnetic members that are attracted to magnets such as electromagnets and/or permanent magnets), batteries, etc. Devices 10 and/or 24 may also include power transmitting and/or receiving circuits configured to transmit and/or receive wired and/or wireless power signals. Input-output devices 16 and/or 30 may also include displays (see, e.g., display 37 of device 24). Device 24 may be, for example, a head-mounted device controlled using internal control circuitry 26 and/or control circuitry associated with a cellular telephone, computer, or other external device that communicates with device 24 via a wired or wireless link. Display 37 in the head-mounted device may display virtual content for a user. Device 24 may be, for example, a virtual reality device that uses display 37 to display the virtual content or may be a mixed reality (augmented reality) device that uses display 37 to display virtual content overlaid on real-world objects. During operation, input gathered from device(s) 10 using input-output devices 16 and/or input gathered from one or more devices 24 using input-output devices 30 may be used in interacting with the virtual content (e.g., controlling movement of virtual objects or otherwise controlling the virtual content displayed for the user).

Figure 2:
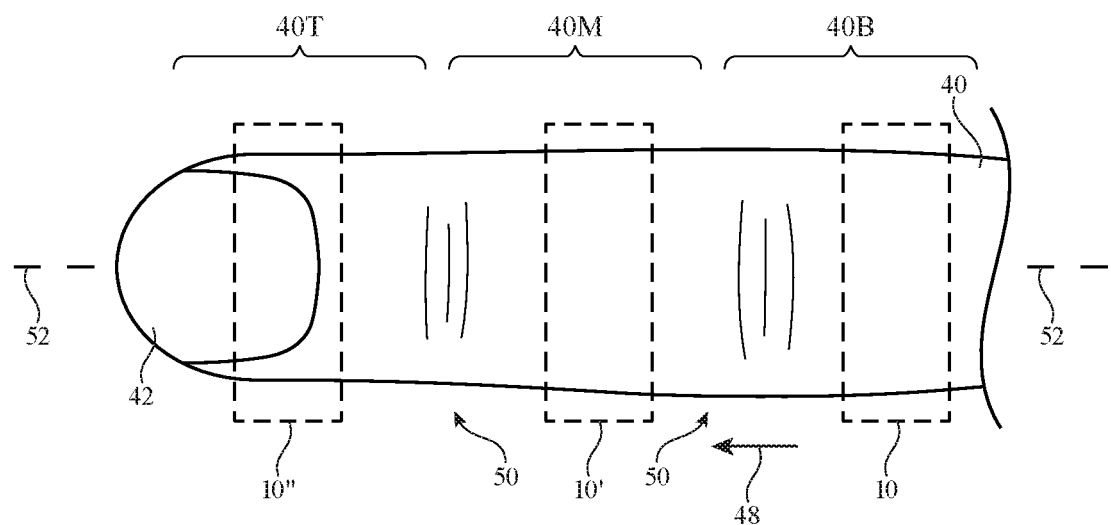
FIG. 2 is a top view of an illustrative finger of a user on which a ring device has been placed in accordance with an embodiment.

FIG. 2 is a top view of a user's finger (finger 40) and an illustrative ring device 10. As shown in FIG. 2, device 10 may be formed from an annular unit that is mounted on or near the base of finger 40. Finger 40 has movable portions including base segment (proximal phalanx) 40B, middle segment (middle phalanx) 40M, and tip segment (distal phalanx) 40T (having fingernail 42), or, in the case of a thumb, has movable tip and base segments. Finger hinge joints 50 are interposed between respective finger segments. Ring 10 may be worn on base segment 40B or, as shown in FIG. 2, may be worn on one or more other finger locations such as illustrative location 10' on middle segment 40M and illustrative location 10" on tip segment 40T. During use, a user may, as an example, push ring device 10 in direction 48 along finger longitudinal axis 52 so that ring device 10 can be worn in location 10' or location 10".

A user may wear one or more of devices 10 simultaneously. For example, a user may wear a single one of devices 10 on the user's ring finger or index finger. As another example, a user may wear a first device 10 on the user's thumb, a second device 10 on the user's index finger, and an optional third device 10 on the user's middle finger. Arrangements in which devices 10 are worn on other fingers and/or all fingers of one or both hands of a user may also be used.

Control circuitry 12 (and, if desired, communications circuitry 14 and/or input-output devices 16) may be contained entirely within device 10 (e.g., in an annular housing) and/or may include circuitry that is coupled to device 10 (e.g., by wires from an associated wrist band, glove, fingerless glove, etc.). Configurations in which devices 10 have bodies that are worn on individual user fingers are sometimes described herein as an example.

During operation, as a user is wearing one or more devices such as ring device 10 on one or more fingers 40 and is optionally providing input to one or more devices 24 in system 8, input circuitry (see, e.g., input-output devices 16) in each device 10 gathers input (e.g., touch input, information on the motion, position, and/or orientation of device 10, input from ultrasonic sensors, radio-frequency sensors, optical sensors, force sensors, inertial measurement units, light detectors, etc.). Input may also be gathered using other sensors in system 8 (e.g., a camera in device 24, a gaze tracker in device 24, a touch sensor in device 24, buttons in device 24, an accelerometer circuitry in device 24, depth sensors in device 24, and/or other input-output devices 30 in devices such as device 24 of FIG. 1). This input from device(s) 10 and/or device(s) 24 may be used to allow a user to interact with virtual content that is presented to a user with a display such as display 37. For example, input from device(s) 10 and/or device(s) 24 may be used to direct control circuitry in system 8 (e.g., control circuitry in a device 24 that includes display 37 and/or an associated device) to move virtual objects such as pointers and other graphical elements, to select menu options, to highlight and/or select items in a list, and/or to otherwise interact with virtual content presented by the display.

Figure 3:
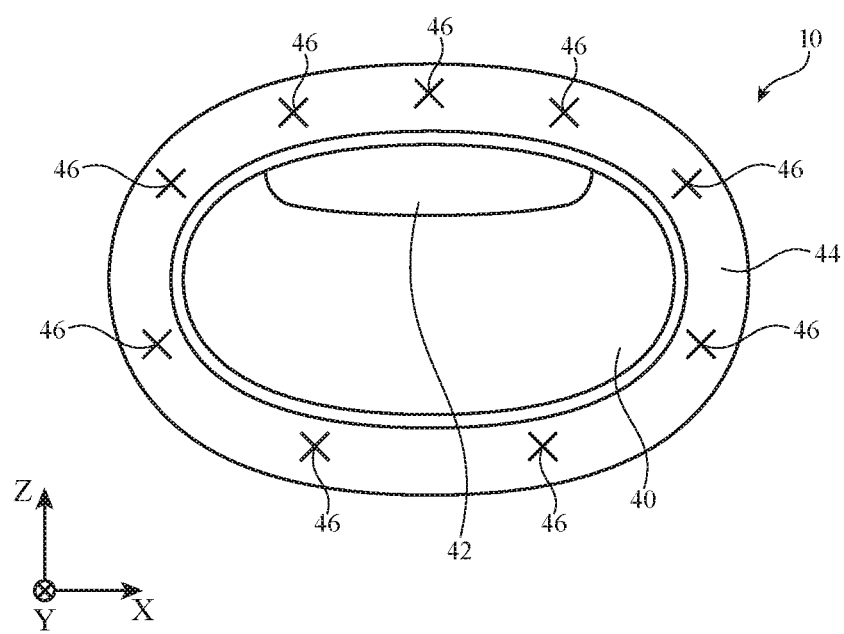
FIG. 3 is a cross-sectional side view of an illustrative ring device on the finger of a user in accordance with an embodiment.

FIG. 3 is a cross-sectional view of an illustrative ring device 10 on finger 40. FIG. 3 shows illustrative locations 46 for electrical components (e.g., control circuitry 12, communications circuitry 14, and/or input-output devices 16) within and/or on the surface(s) of ring device housing 44. These components may, if desired, be incorporated into other portions of housing 44, expandable housing portions, etc.

As shown in FIG. 3, housing 44 may have a ring shape (e.g., housing 44 may have an annular housing structure that surrounds most or all of finger 40 when finger 40 is received within the central opening of housing 44 while device 10 is being worn by a user). Housing 44 may be formed from metal, ceramic, glass, polymer, fabric, wood, other materials, and/or combinations of these materials. In some configurations, circuitry for device 10 may be contained in an interior portion of housing 44 defined by housing walls in housing 44. In other configurations, circuitry for device 10 may be mounted exterior housing portions or embedded in housing walls or other housing structures.

During operation, a user may press against external structures with device 10 and/or may otherwise interact with device 10. For example, device 10 may be moved in three-dimensions as a user moves fingers 40 and/or other body parts through the air (e.g., a user may make an up-and-down gesture with finger 40) or may tap on a tabletop. These finger movements and other finger input (finger input involving particular finger orientations, finger positions, etc.) may be used in controlling system 8.

If desired, a user may supply input to device 10 by interacting with device 10 using one or more fingers other than the finger on which device 10 is being worn. As an example, a user may be wearing ring device 10 on the ring finger of the user's left hand. When it is desired to interact with ring device 10, a user may use one or more fingers of the user's right hand to adjust a button on device 10, to supply touch input to a touch sensor on device 10, to tap device 10, and/or to otherwise provide input is gathered using sensors and other input devices in device 10.

In some arrangements, lateral movement of finger 40 in the X-Y plane may be sensed. These lateral movements may, for example, be sensed using force sensors or other sensors on the sidewalls of housing 44 or other portions of housing 44 (e.g., because lateral movement will tend to press portions of finger 40 against some sensors more than others and/or will create shear forces that are measured by force sensors that are configured to sense shear forces). Other sensors such as inertial measurement units in device 10 (e.g., sensors that include accelerometers, gyroscopes, and/or compasses) may also be used in measuring finger orientation, position, and/or motion.

In general, any suitable sensing circuitry such as ultrasonic sensors, optical sensors, inertial measurement units, strain gauges and other force sensors, radio-frequency sensors, and/or other sensors may be used in gathering sensor measurements indicative of the activities of finger 40 while ring device 10 is being worn on finger 40. If desired, these sensors may also be used in mapping the contours of three-dimensional objects (e.g., by time-of-flight measurements and/or other measurements). For example, an ultrasonic sensor such as a two-dimensional image sensor or an ultrasonic sensor with a single ultrasonic transducer element may emit free-space ultrasonic sound signals that are received and processed after reflecting off of external objects. This allows a three-dimensional ultrasonic map to be generated indicating the shapes and locations of the external objects.

In some configurations, finger activity information (position, movement, orientation, etc.) may be gathered using sensors that are mounted in external electronic equipment (e.g., in a computer or other desktop device, in a head-mounted device or other wearable device, and/or in other electronic device 24 that is separate from device 10). For example, optical sensors such as images sensors that are separate from devices 10 may be used in monitoring devices 10 to determine their position, movement, and/or orientation. If desired, devices 10 may include passive and/or active optical registration features to assist an image sensor in device 24 in tracking the position, orientation, and/or motion of device 10. For example, devices 10 may include light-emitting devices such as light-emitting diodes and/or lasers. The light-emitting devices may be arranged in an asymmetric pattern on housing 44 and may emit light that is detected by an image sensor, depth sensor, and/or other light-based tracking sensor circuitry in device 24. By processing the received patterned of emitted light, device 24 can determine the position, orientation, and/or motion of device 10.

Figure 4:
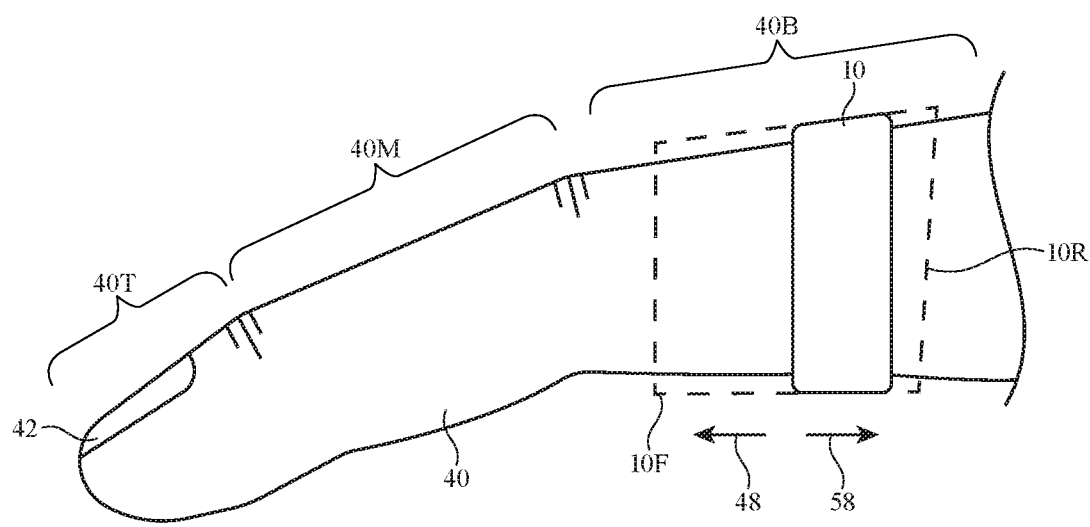
FIG. 4 is a side view of an illustrative expandable ring device on a finger in accordance with an embodiment.

As shown in FIG. 4, housing 44 of ring device 10 may, if desired, be expanded by a user. For example, one or more portions of housing 44 may be extended rearwards towards position 10R (e.g., in direction 58 away from middle segment 40M) and/or one or more portions of housing 44 may be extended forwards towards position 10F (e.g., in direction 48 towards middle segment 40M and/or towards tip segment 40T). These extensions may cause housing 44 to overlap additional portions of finger 40 or all of finger 40. Extensions to housing 44 may provide device 10 with additional capabilities (e.g., enhance sensing, enhanced light-output area for light-emitting devices used as registration features, additional surface area for user input such as user input to a capacitive touch sensor or other touch sensor, additional area for a display, etc.).

Figure 5:
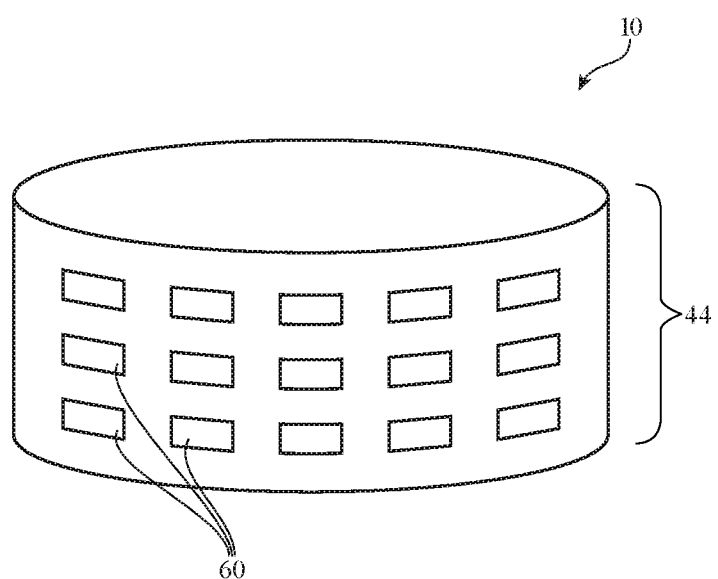
FIG. 5 is a perspective view of components in an illustrative ring device in accordance with an embodiment.

FIG. 5 is a perspective view of ring device 10 showing how ring device 10 may contain components 60 (e.g., integrated circuits, electrodes, discrete components, packaged circuits, unpackaged semiconductor dies, electrodes and other sensor structures, and/or other electrical devices and circuits for forming circuitry in device 10 such as circuitry 12, circuitry 14, and/or devices 16 of FIG. 1). Components 60 may be mounted within the interior of housing 44, on the exterior of housing 44, and/or may be embedded within housing 44 (e.g., in a housing wall). Components 60 may include sensors 18, capacitive sensor electrodes for a capacitive touch sensor and/or capacitive proximity sensor, force sensor elements (e.g., strain gauges on bendable components, piezoelectric force sensor devices, etc.), optical components such as light sensors, proximity sensors, and/or optical touch sensors, radio-frequency devices, ultrasonic sensor circuits, actuators for forming haptic output devices and other components (e.g., piezoelectric actuators, shape memory alloy actuators, electromagnetic actuators such as electromagnetic vibrators, etc.), electromagnets, displays, light-emitting diodes or other visual output devices, and/or other components. Components 60 may be organized in any suitable pattern (e.g., in a one-dimensional line running around some or all of the circumference of ring device 10, in a two-dimensional array having rows and columns that wraps around some or all of the circumference of ring device 10, in one or more discrete locations, etc.). In some arrangements, multiple layers of components 60 may be provided. For example, a one-dimensional or two-dimensional array of haptic output devices may be overlapped by a one-dimensional or two-dimensional array of capacitive sensor electrodes in a one-dimensional or two-dimensional touch sensor array (e.g., a sensor array on an annular housing member and/or an expandable housing portion in device 10).

Figure 6:
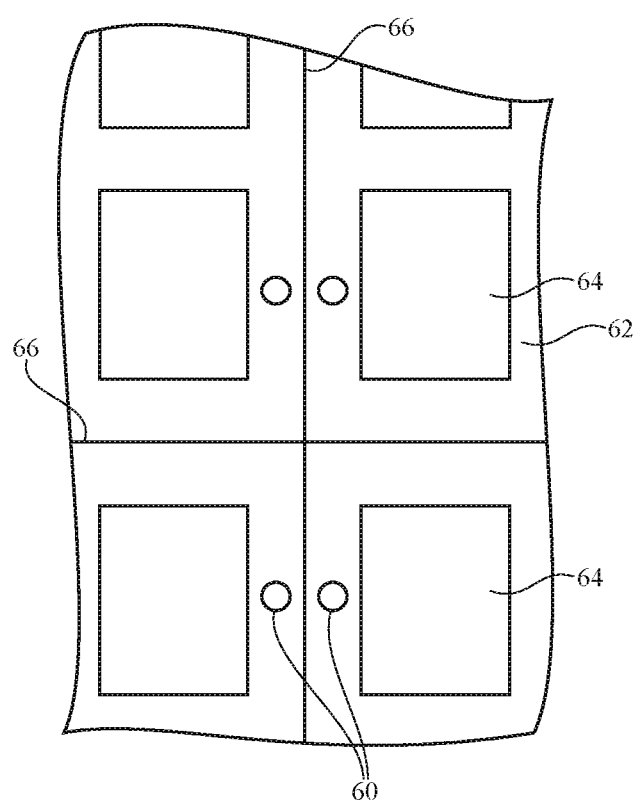
FIG. 6 is a top view of a portion of an illustrative substrate that may be used in a ring device in accordance with an embodiment.

Components 60 may be mounted on substrates in ring device 10. A top view of an illustrative substrate 62 for device 10 is shown in FIG. 6. Substrate 62 may be a rigid printed circuit substrate (e.g., a printed circuit substrate for a printed circuit formed from fiberglass-filled epoxy or other rigid printed circuit board substrate material) or may be a flexible printed circuit substrate (e.g., a flexible sheet of polyimide or other flexible printed circuit substrate layer for a flexible printed circuit). Optional openings 64 may be formed in substrate 62 to enhance flexibility (e.g., to allow substrate 62 to conform to the shape of a user's finger, to allow substrate 62 to expand and/or contract during use of ring device 10, etc.). Signal paths may be formed on substrate 62 using metal traces 66. Components 60 may be mounted to metal traces in substrate 62 using joints formed from solder, conductive adhesive, welds, or other conductive connections. Openings 64 may be arranged in an array or other suitable pattern and may have any suitable shape. For example, openings 64 may be configured to create serpentine strips of substrate material 62 in a matrix pattern (e.g., serpentine substrate segments coupling together islands of substrate material on which components 60 are located). Substrate 62 may be located within an interior portion of housing 44 (e.g., mounted to an inner surface of a housing wall), may be embedded in a housing wall or other housing structure, may be coupled to one or more external housing surfaces and/or may otherwise be incorporated into housing 44 and device 10.

Figure 7:
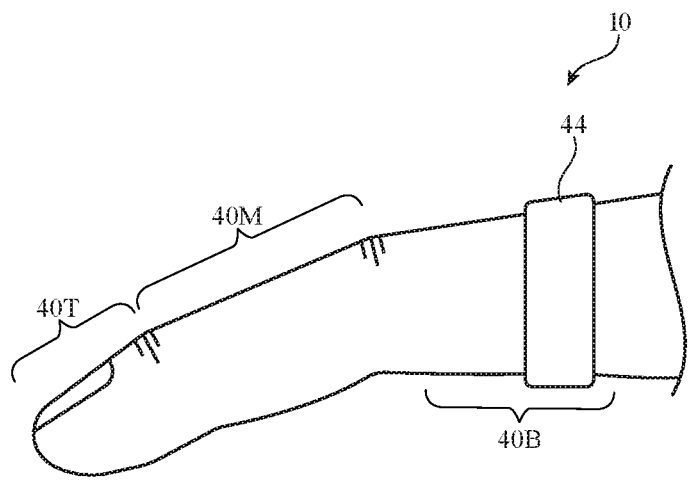
FIG. 7 is a side view of an illustrative ring device in an unexpanded state in accordance with an embodiment.
Figure 8:
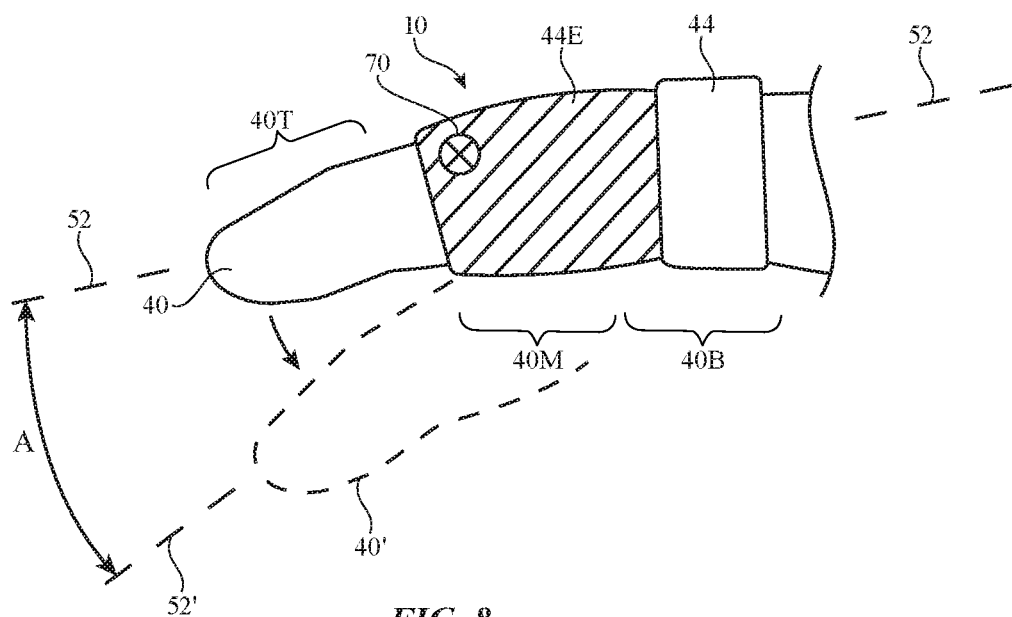
FIG. 8 is a side view of the illustrative ring device of FIG. 7 following expansion of the device along the length of a finger in accordance with an embodiment.

FIG. 7 is a side view of an illustrative ring device in an unexpanded state. In the example of FIG. 7, device housing 44 covers part of the user's finger in base segment 40B while leaving the surface of middle finger segment 40M uncovered. As shown in FIG. 8, ring device 10 may be expanded to a configuration in which housing portion 44E extends over additional portions of base segment 44B and, if desired, additional portions of middle segment 44M and tip segment 44T of finger 40. The expanded area for ring device 10 that is provided by housing portion 44E may be used to support one or more items such as item 70. Item 70 may include some or all of one or more of components 60, and/or any other circuitry in device 10 (sensors, 18, haptic output devices 20, other devices 16, etc.). If desired, item 70 may be a visual marker for enhanced camera tracking (e.g., a retroreflector or fiducial) and/or may be a light source such as a light-emitting diode for enhanced camera tracking. Sensors and/or other components may be mounted at one or more locations in extended housing portion 44E of the housing of ring device 10 to gather sensor measurements. If desired, strain gauge circuitry with one or more strain gauges or other sensor circuitry that is sensitive to bending forces can be incorporated into housing portion 44E to serve as an angular sensor for device 10. During operation, the angular sensor may initially detect that finger 40 is straight and lies along longitudinal axis and may subsequently detect that one or more segments of finger 40 have been bent at a non-zero angle A with respect to axis 52 (e.g., into alignment with axis 52', which lies at non-zero angle A with respect to axis 52). Finger bending information (finger segment angular orientation information) may be used as input in controlling system 8 (e.g., this information may be transmitted wirelessly or via a wired connection to devices 24 during operation of system 8 to control devices 24).

Figure 9:
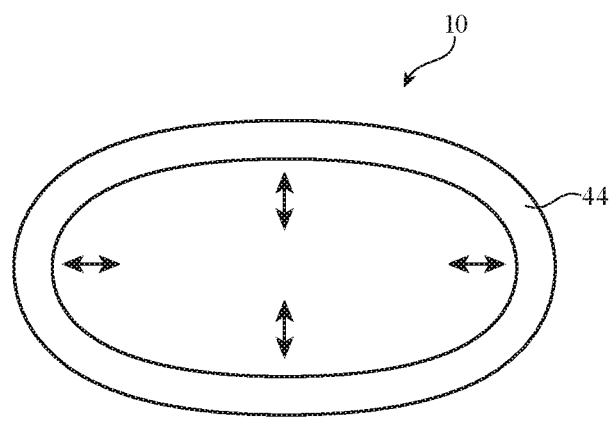
FIG. 9 is a cross-sectional side view of an illustrative ring device showing how the ring device may be caused to radially contract and expand in accordance with an embodiment.

As shown in the cross-sectional side view of ring device 10 of FIG. 9, components 60 may be used to radially express and/or radially expand housing 44. Components 60 may include electrically adjustable actuators such as piezoelectric elements, a piezoelectric inertial pin matrix and creates a course XYZ grid around the ring, soft electroactive polymer actuators (e.g., actuators that can tighten housing 44), electromagnetic actuators (e.g., an electromagnetic actuator that selectively joins and separates concentric inner and outer ring members, pneumatic bladders, or shape memory alloy actuators. Housing 44 of ring device 10 of FIG. 9 may have an inner annular portion and an outer portion (with an annular shape or other suitable shape) that moves relative to the inner portion as shown in FIG. 9. This allows housing 44 to be radially enlarged when placing ring device 10 on finger 40 and to be radially contracted to help secure ring device on finger 40. If desired, housing 44 may be radially expanded to facilitate interactions between the exterior surface of housing 44 and adjacent fingers of the user (e.g., to facilitate the input of a thumb gesture to a touch sensor, force sensor, scrolling button, or other input device on housing 44).

Figure 10:
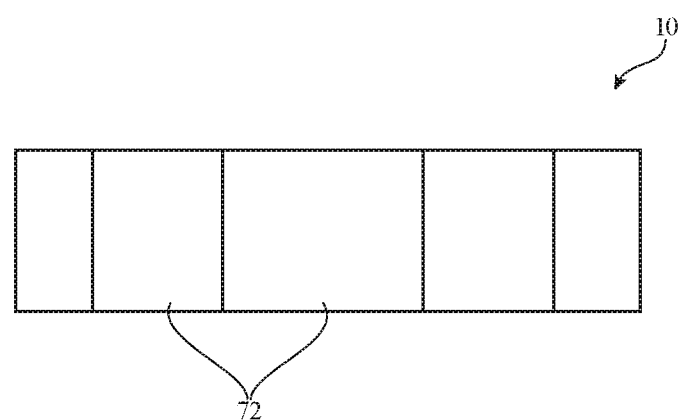
FIG. 10 is a top view of an illustrative ring device with segmented structures in accordance with an embodiment.

FIG. 10 is a top view of an illustrative ring device with illustrative circumferentially segmented structures 72. Structures 72 may be ring links such as removable housing links in a configuration for device 10 in which a user may add or subtract links to help provide ring device 10 with a desired size and/or may be internal structures in device 10. For example, structures 72 may be segmented battery structures (e.g., battery cells) that are mounted in housing 44 (e.g., in separate housing segments and/or in the interior of a seamless single housing structure 44).

Figure 11:
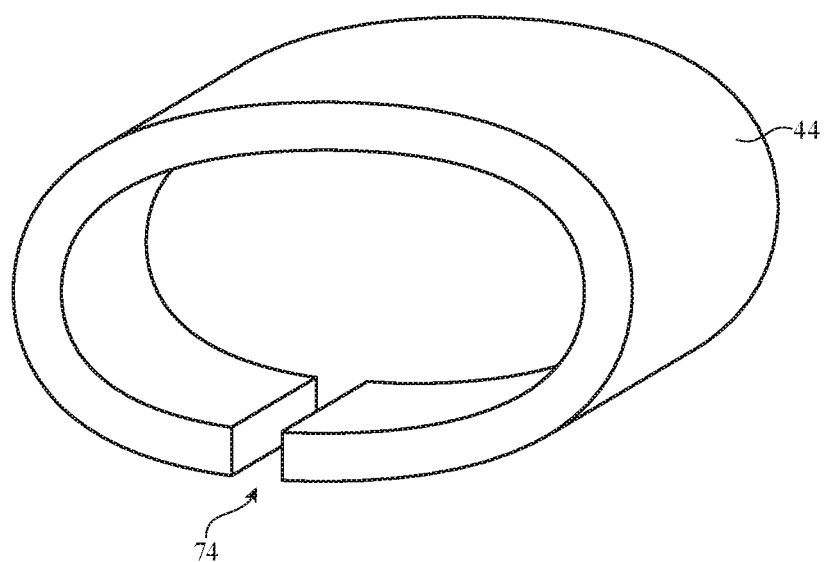
FIG. 11 is a perspective view of an illustrative ring device with a gap in accordance with an embodiment.
Figure 12:
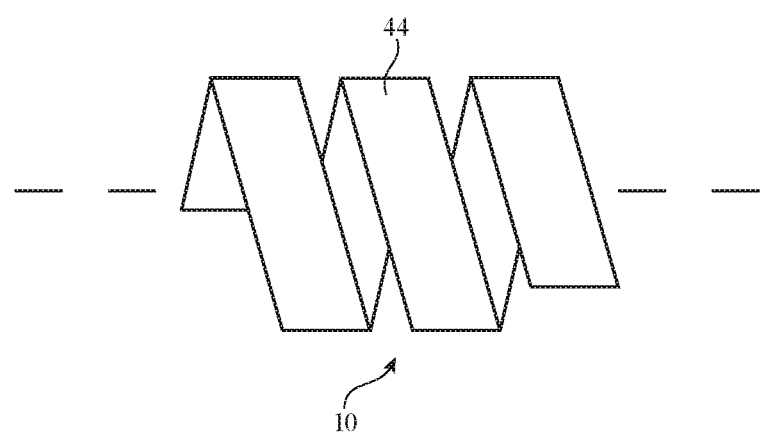
FIG. 12 is a top view of an illustrative ring device with a helical housing in accordance with an embodiment.

If desired, housing 44 may have a modified ring shape. For example, housing 44 may have a ring shape with a gap such as housing gap 74 of FIG. 11. Housing gap 74 may allow housing 44 to flex and expand when receiving a user's finger. As shown in FIG. 12, housing 44 may have other shapes such as the helical shape of FIG. 12. Housing 44 may be rigid or may be flexible (e.g., to accommodate finger bending, etc.).

Figure 13:
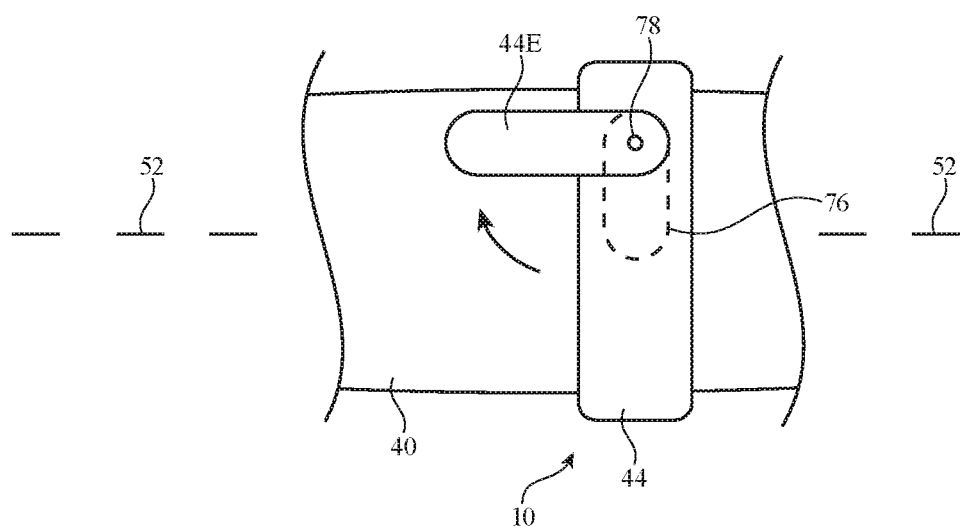
FIG. 13 is a top view of an illustrative ring device with a rotating housing member that swings away from a main body portion of the housing in accordance with an embodiment.

If desired, housing 44 may have portions that expand by rotation (e.g., by pivoting about an axis). As an example, rotatable housing member 44E of device 10 of FIG. 13 may be stored in position 76 on the main body of housing 44. In this stored configuration, housing member 44E may be perpendicular to longitudinal axis 52. When it is desired to expand device 10, housing member 44E may be rotated using hinge 80 so that housing member 44E extends along axis 52, parallel to finger 40.

Figure 14:
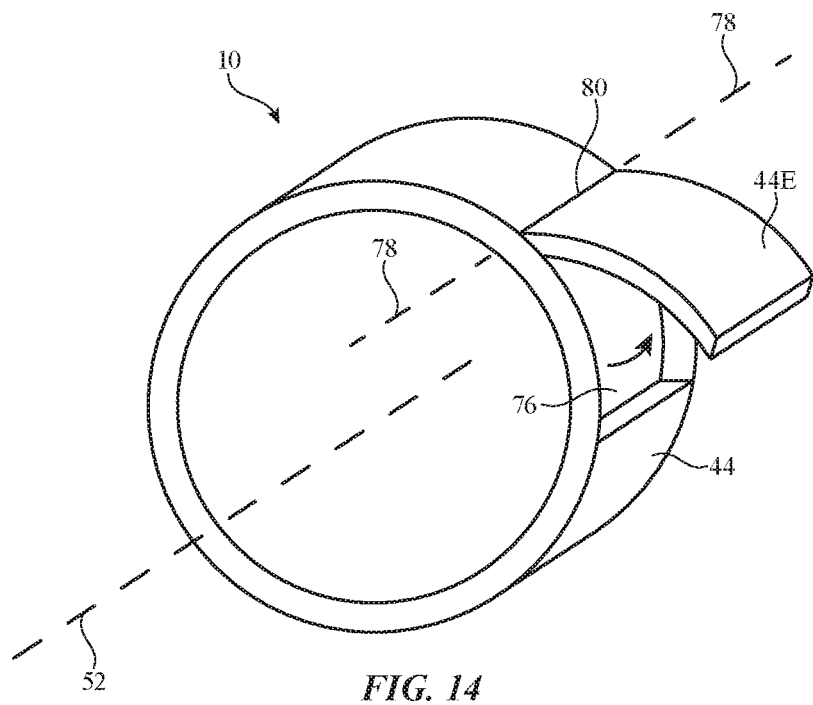
FIG. 14 is a perspective view of an illustrative ring device with a side flap in accordance with an embodiment.

In the illustrative configuration of FIG. 14, ring device 10 has a side flap formed from housing portion 44E. Hinge 80 lies along hinge axis 78 parallel to longitudinal axis 52 and allows housing portion 44E to be rotated between storage location 76 (in which portion 44E is received within a recess in housing 44 and lies flush with the outer surface of housing 44) and a deployed location in which flap 44E is extended to expand ring device 10 as shown in FIG. 14.

Figure 15:
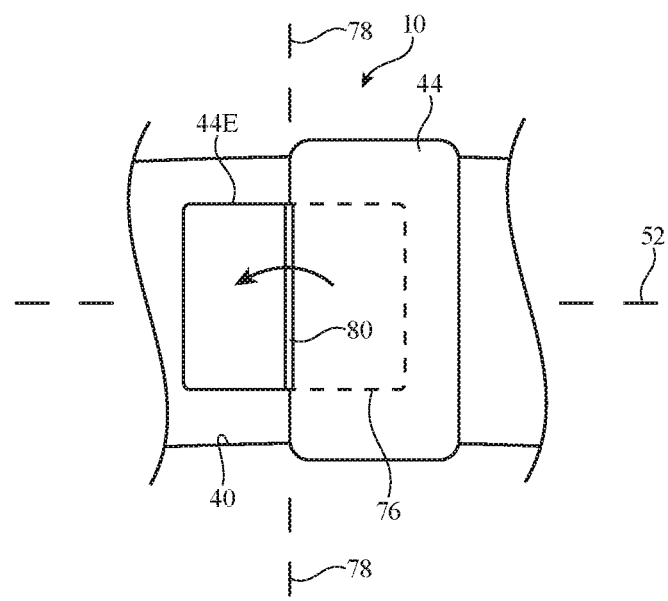
FIG. 15 is a top view of an illustrative expandable ring device in accordance with an embodiment.

In the example of FIG. 14, hinge axis 78 for hinge 80 is parallel to longitudinal axis 52. If desired, hinge axis 78 may be oriented in different directions. In the example of FIG. 15, extendable portion 44E forms a deployable flap for housing 44. Hinge 80 of device 10 in FIG. 15 may allow portion 44E to be stowed in storage position 76 (e.g., a position in which portion 44E lies flush with the remainder of housing 44). When it is desired to deploy portion 44E to expand housing 44, hinge 80 allows portion 44E to be rotated about hinge axis 78 into the position shown in FIG. 15 (e.g., a position in which portion 44E extends outwardly along longitudinal axis 52. Hinge axis 78 of FIG. 15 is perpendicular to longitudinal axis 52. If desired, hinge axis 78 may be oriented at other non-zero angles with respect to longitudinal axis 52 (e.g., one or more flaps, rotating portions, or other expandable portions of housing 44 that are coupled to the main body of housing 44 using hinge structures may be rotated into position along other hinge axes). Portion 44E may contain input-output devices 16 and/or other circuitry (e.g., touch sensors, strain gauges, haptic output devices, etc. If desired, portion 44E may have multiple hinged segments so that portion 44E can be deployed to form an elongated panel.

Figure 16:
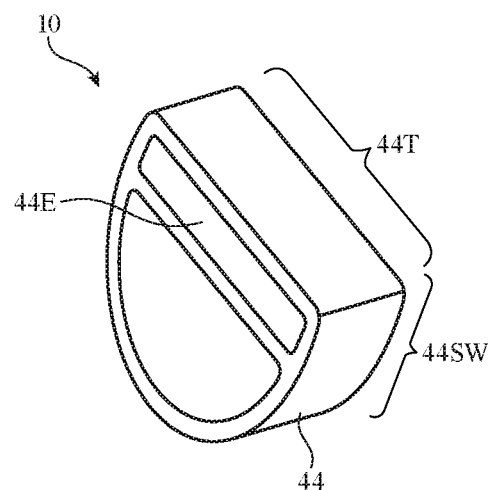
FIG. 16 is a perspective view of an illustrative expandable ring device in an unexpanded configuration in accordance with an embodiment.
Figure 17:
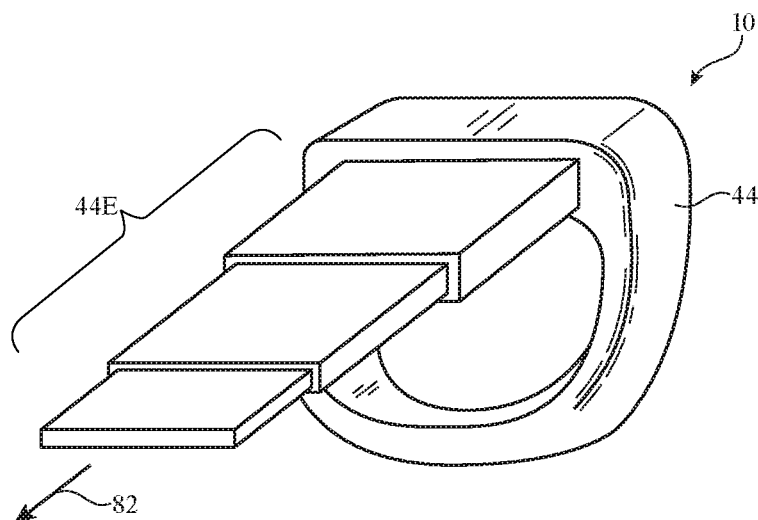
FIG. 17 is a perspective view of the illustrative expandable ring device of FIG. 16 in an expanded configuration in accordance with an embodiment.
Figure 18:
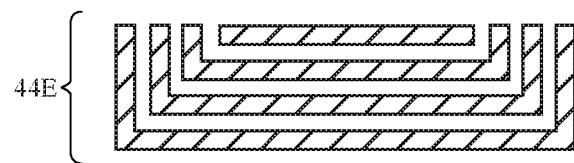
FIG. 18 is a cross-sectional side view of illustrative nested housing sections in an expandable ring device in accordance with an embodiment.

If desired, ring device 10 may have housing structures that are deployed by sliding. As an example, consider the arrangement of FIG. 16. In the illustrative configuration of FIG. 16, housing 44 of ring device 10 has an annular main housing member with an upper portion having a planar surface such as upper portion 44T and curved sidewall portions such as portions 44SW. Other shapes may be used for forming housing 44, if desired. Expandable housing portion 44E of ring device 10 is in an unextended (stored) state in the arrangement of FIG. 16. When it is desired to expand ring device 10, expandable portion 44E may be expanded in direction 82 away from the main body of housing 44, as shown in FIG. 17. Expandable portion 44E may have any suitable cross-sectional shape (e.g., a thin box shape, a shape with curved and/or straight sides, etc.). Expandable portion 44E may have a single member that slides out of housing 44 or may have multiple telescoping segments as shown in FIG. 17. The telescoping segments may be flat tray-shaped housing segments that nest within each other when expandable portion 44E is retracted into housing 44. In the example of FIG. 17, each segment of portion 44E is received within the interior of a successive slightly larger segment. If desired, other nesting arrangements may be used such as the illustrative nesting arrangement for the segments in expandable housing portion 44E that is shown in the cross-sectional side view of FIG. 18.

Figure 19:
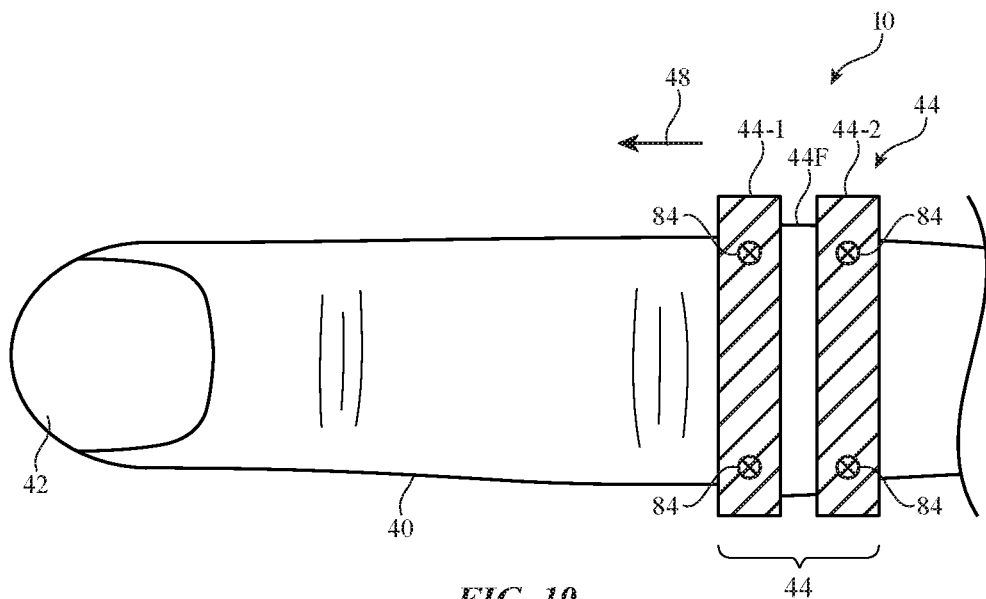
FIG. 19 is a top view of an illustrative expandable ring device with two movable parts coupled by an expandable housing portion formed from a flexible coupling structure in accordance with an embodiment.
Figure 20:
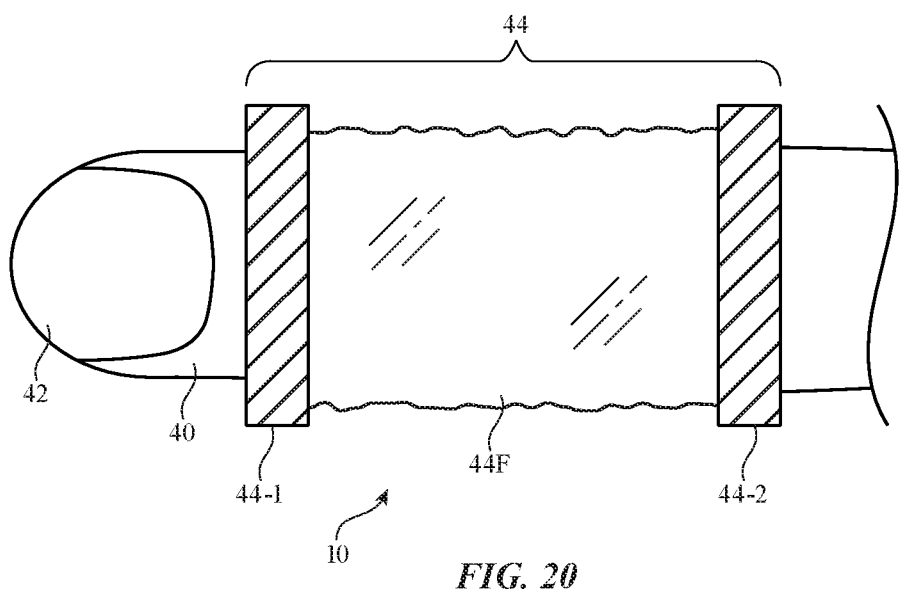
FIG. 20 is a top view of the illustrative expandable ring device of FIG. 19 in an expanded state in accordance with an embodiment.

FIGS. 19 and 20 are top views of an illustrative expandable ring device with a flexible coupling portion between movable ring members. FIG. 19 shows device 10 in an unexpanded configuration. In this arrangement, annular housing members 44-1 and 44-2 of housing 44 are closed to each other (e.g., members 44-1 and 44-2 are adjacent to each other and are optionally coupled using magnets 84 such as permanent magnets, electromagnets, and/or iron bars or other structures formed from magnetic material and/or other releasable coupling mechanisms). Portion 44F of housing 44 may be formed from a tube of collapsible material such as fabric, a flexible layer of material such as a flexible polymer, a mesh formed from polymer, metal, and/or other materials, segments that are joined to form an accordion-shaped housing structure, and/or other expandable housing structures (e.g., other flexible tubular layers that can be stretched and compressed). When it is desired to expand device 10, housing members 44-1 and 44-2 may be separated. For example, member 44-1 may be moved away from member 44-2 in direction 48 along the length of finger 40. Following expansion, expandable tubular housing portion 44F may cover additional segment(s) of finger 40, as shown in FIG. 20.

The arrangement of FIGS. 19 and 20 (and/or other expandable arrangements for ring housing 44) allows portions 44-1 and 44-2 to be temporarily separated from each other by an enhanced distance. Location sensors or other input-output devices 16 that are located in housing 44 (e.g., in portions 44-1 and 44-2 in the example of FIGS. 19 ad 20) may therefore be separated by an enhanced distance from each other (e.g., expanding housing 44 may move optical sensor targets, inertial measurement unit components, or other devices at a temporarily increased distance from each other). The increased separation between these components when housing 44 is expanded may help increase sensor accuracy (e.g., by allowing location sensors to be located farther apart than would otherwise be possible and thereby allowing each of these sensors to gather separate information on the position of different respective parts of finger 40 as opposed to gathering information on the position of finger 40 from single sensor). For example, the locations of the first and third knuckles of a user's finger can be sensed, providing enhanced tracking of the movement of a user's finger.

Figure 21:
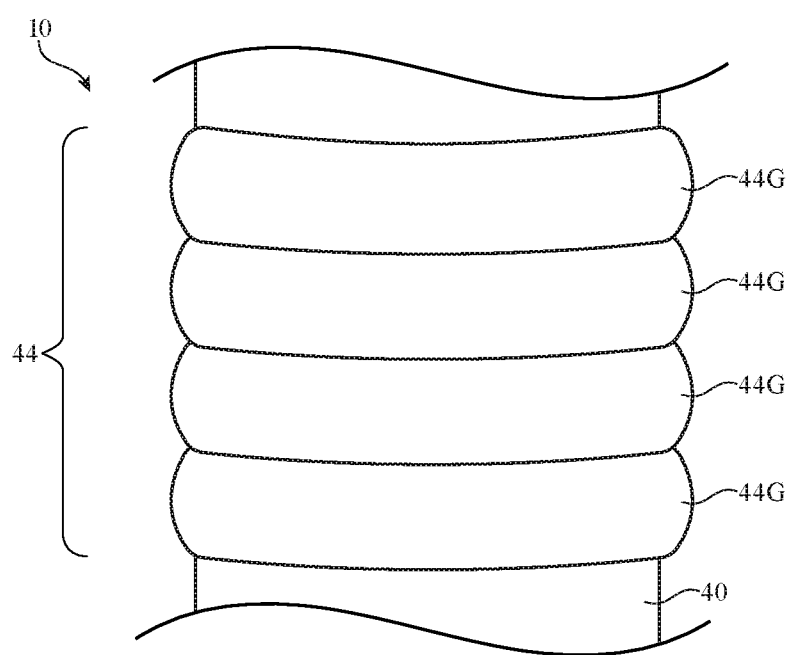
FIG. 21 is a top view of an illustrative segmented expandable ring device in accordance with an embodiment.

FIG. 21 is a top view of an illustrative expandable ring device in which housing 44 has been formed from a tubular expandable structure having a series of linked segments 44G such as segments formed from a tube of wrinkled fabric or other layer of material with segments that can be folded and/or bunched together to shrink the length of the housing. Device 10 of FIG. 21 is shown in an unexpanded state. When it is desired to expand device 10, housing 44 can be expanded by moving segments 44G outwardly along finger 40, causing each of the segments to stretch and lengthen.

Figure 22:
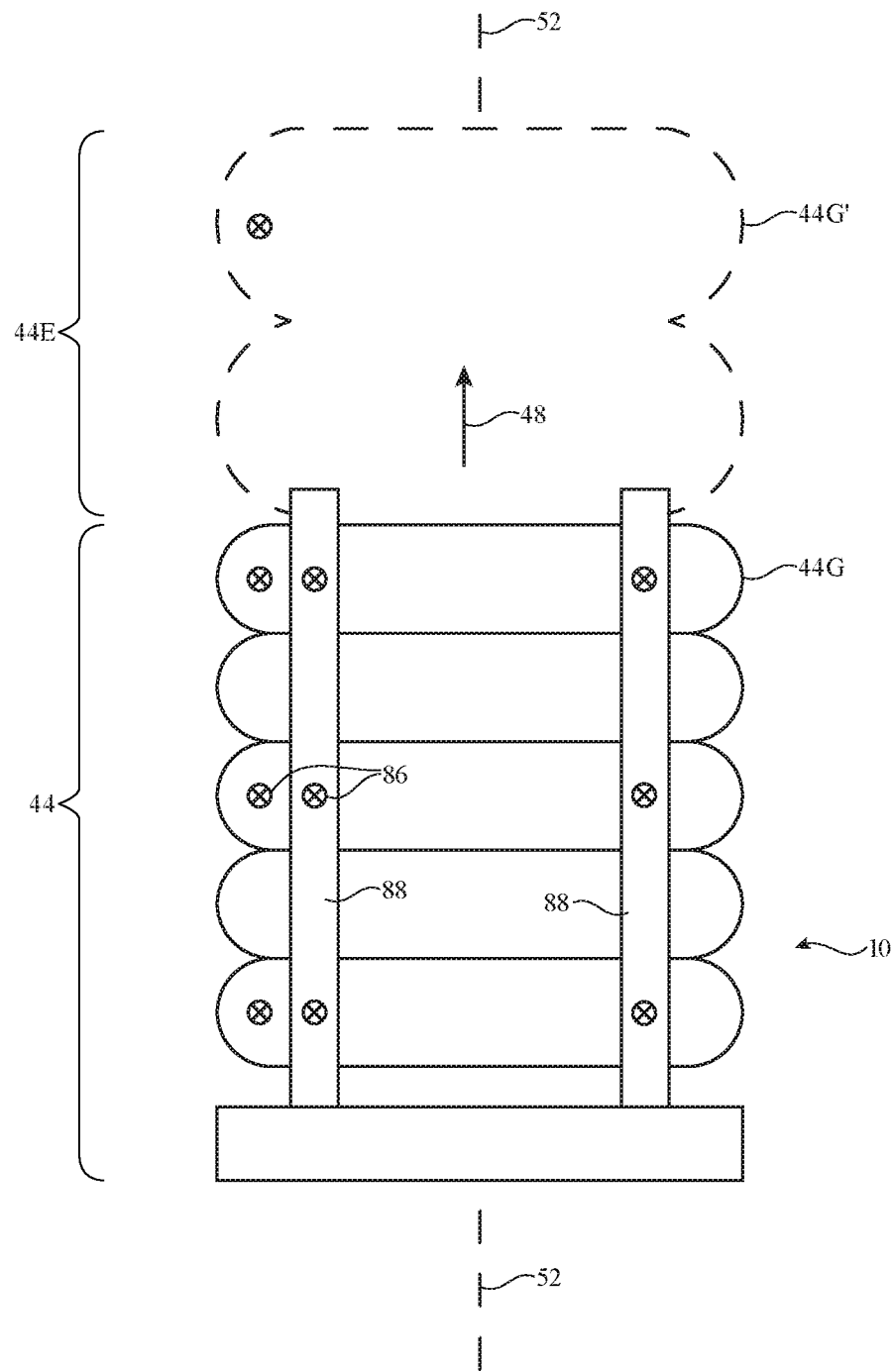
FIG. 22 is a cross-sectional side view of an illustrative segmented expandable ring device with internal rails in accordance with an embodiment.

FIG. 22 is a cross-sectional view of an illustrative segmented expandable ring device with internal rails 88. Housing 44 of FIG. 22 forms an expandable tube with a series of linked segments 44G. When unextended, segments 44G are compressed against each other and can be held in place temporarily using magnetic engagement elements 86 (e.g., magnets and/or magnetic members such as iron bars) on guide rails 88 and/or on segments 44G. When it is desired to extend housing 44, a user may press housing portion 44E outwardly in direction 48 (e.g., using the user's thumb), causing segments 44G to stretch and expand, as illustrated by expanded (stretched) segments 44G' of extended portion 44E. The material of housing 44 (e.g., fabric, silicone, strands of material, and/or other expandable structures) may be used to help hold housing 44 in its expanded configuration.

Figure 23:
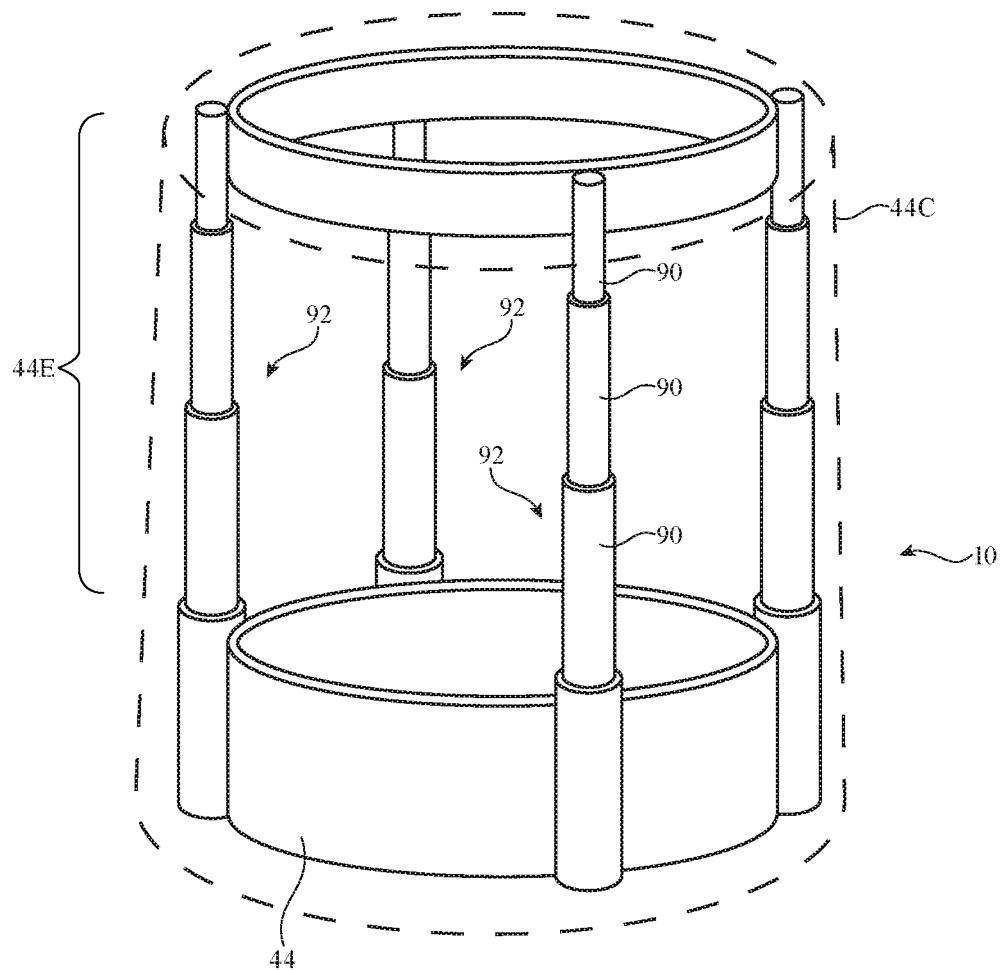
FIG. 23 is a perspective view of an illustrative expandable ring device with a telescoping frame in accordance with an embodiment.

FIG. 23 is a perspective view of an illustrative configuration for ring device 10 in which housing 44 has a telescoping frame formed from frame legs 92 that each contain a series of nested (telescoping) frame members 90. Telescoping frame legs 92 may be supported by a main annular housing member and can be retracted so that housing 44 has a compact ring shape or can be extended to from expanded portion 44E. Optional housing materials such as flexible cover layer 44C (e.g., an expandable covering tube formed from a layer of fabric, a flexible polymer layer, a mesh of polymer or other material, etc.) may be used to cover the frame formed from the main ring-shaped housing member of housing 44 and the telescoping legs formed from nested frame members 90.

Figure 24:
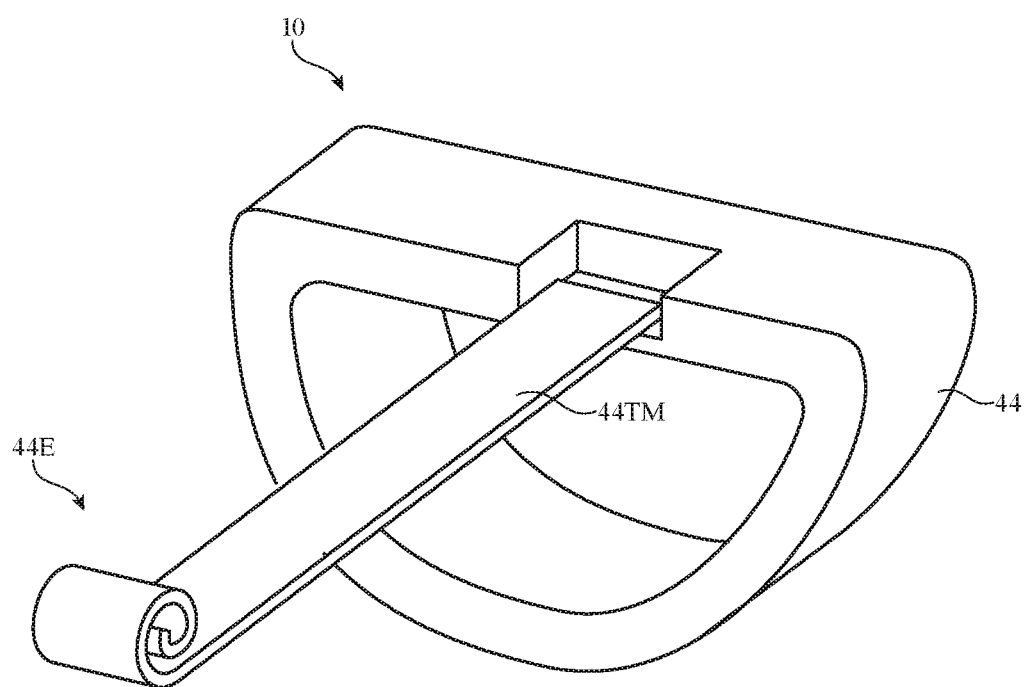
FIG. 24 is a perspective view of an illustrative expandable ring device with a flexible structure that can be unrolled to expand the ring device in accordance with an embodiment.

If desired, device 10 may include one or more portions that can be rolled up or unrolled. As shown in FIG. 24, for example, housing 44 may have a strip-shaped housing member 44TM that can be rolled or unrolled (sometimes referred to as a tape member, rollable member, rollable housing strip, rollable housing member, etc.). Housing member 44TM forms expandable portion 44E. Housing member 44TM may be rolled up into a recess in the main annular body portion of housing 44 for storage or may, as shown in FIG. 24, be unrolled to form expanded portion 44E. As with the other illustrative expanded portions 44E described herein, sensors, haptic output devices, markers, display devices, touch sensor electrodes, light-emitting components, and/or other circuitry may be formed in portion 44E.

Figure 25:
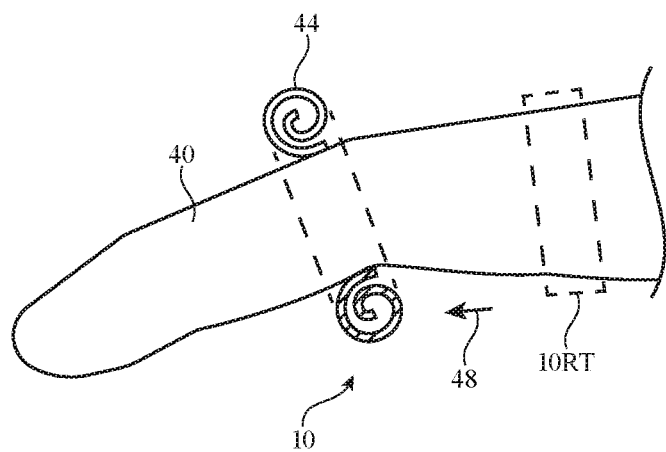
FIG. 25 is a cross-sectional side view of an illustrative ring device that expands by unrolling along a finger in accordance with an embodiment.
Figure 26:
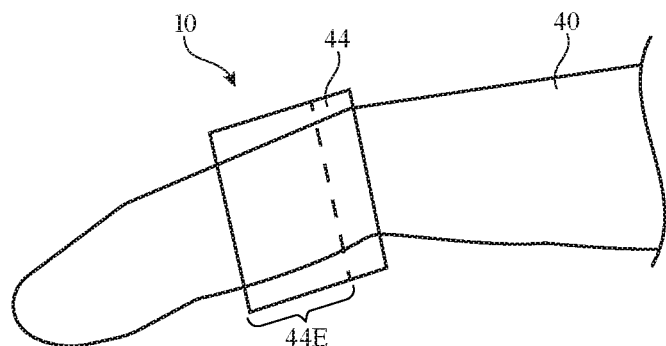
FIG. 26 is a side view of the illustrative ring device of FIG. 25 in an unrolled configuration in accordance with an embodiment.

FIG. 25 is a cross-sectional view of an illustrative expandable ring device that includes a rolled up tube of material that extends around the circumference of the user's finger. As shown in FIG. 25, a user may initially wear device 10 in location 10RT (e.g., on a base segment of finger 40). When it is desired to use device 10, the user may optionally move device 10 forward in direction 48 (e.g., by pushing device 10 forward with the user's thumb). Housing 44 of device 10 is formed from an annular rolled up tube of material (e.g., a tubular structure formed from a rolled up layer of fabric, flexible polymer such as silicone or other elastomeric material, mesh-shaped layers, or other rollable tube of material that can be rolled into an annular housing of the type shown in FIG. 25). When pushed in direction 48 the rolled up tube of material forming housing 44 can be unrolled to form expanded housing portion 44E, as shown in FIG. 26.

Figure 27:
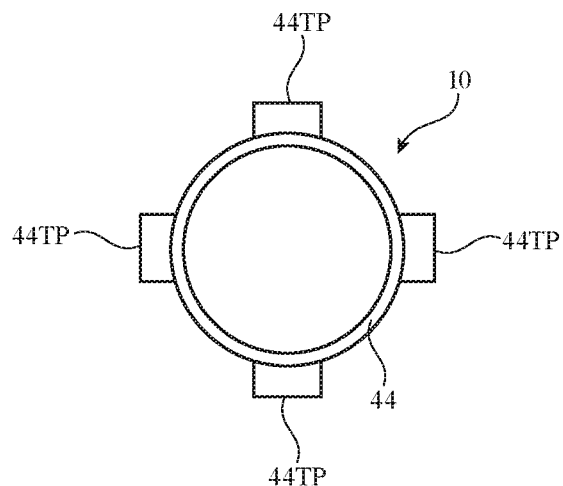
FIG. 27 is a cross-sectional side view of an illustrative expendable ring device with four expandable prongs formed from tape members that can roll and unroll in accordance with an embodiment.
Figure 28:
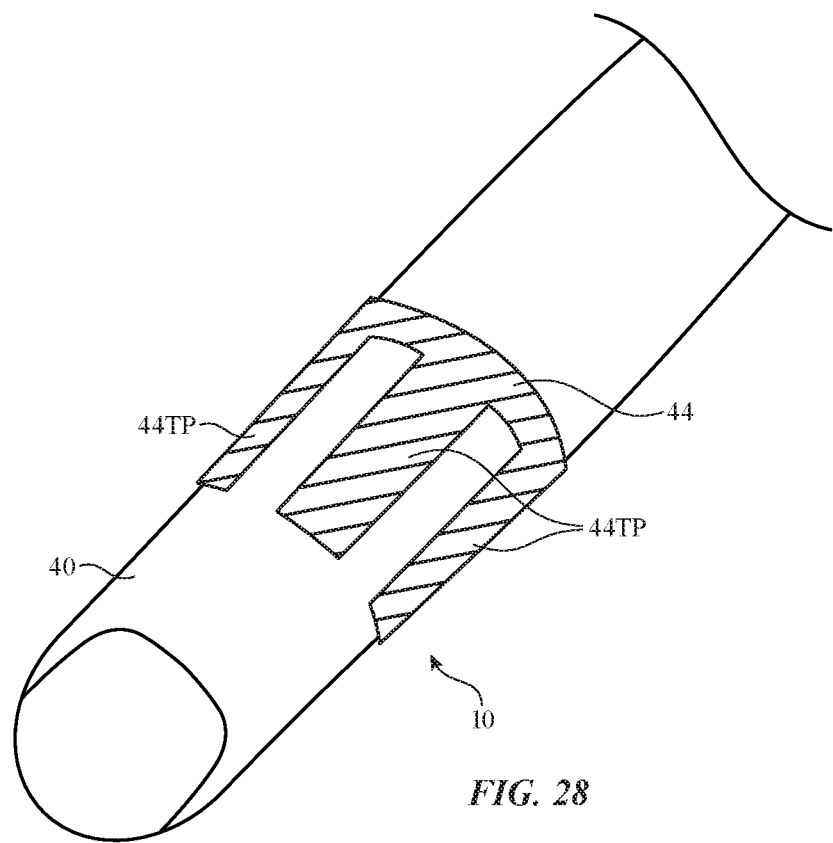
FIG. 28 is a perspective view of the illustrative expandable ring device of FIG. 27 in a configuration in which the expendable prongs have been deployed to place the ring device in an expanded configuration in accordance with an embodiment.

Another illustrative configuration for housing 44 is shown in FIGS. 27 and 28. As shown in the cross-sectional end view of device 10 of FIG. 27, housing 44 may have rollable strip-shaped housing members such as rollable portions 44TP, which are rolled up for storage in the configuration of FIG. 27. There are four rollable portions 44TP equally spaced around the circumference of ring-shaped housing 44 in the example of FIG. 27, but fewer than four rollable portions or more than four rollable portions may be formed in device 10, if desired. To expand housing 44 for use, a user may unroll each of portions 44T, thereby extending these housing structures along the length of finger 40 as shown in FIG. 28.

Figure 29:
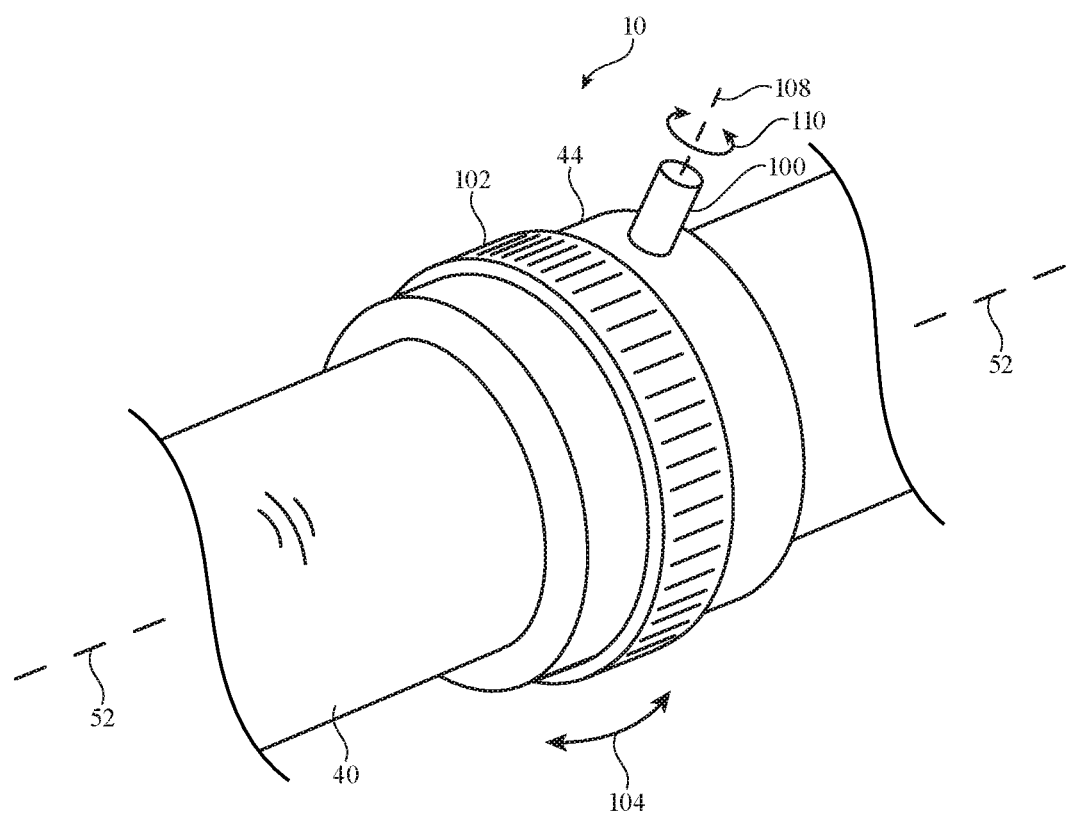
FIG. 29 is a perspective view of an illustrative ring device with movable input devices such as rotatable buttons in accordance with an embodiment.

In some arrangements, ring device 10 may include movable mechanical buttons (sometimes referred to a switches, slider buttons, digital crowns, rotating knobs, movable controls, etc.). Consider, as an example, ring device 10 of FIG. 29. A shown in FIG. 29, housing 44 of device 10 has a main annular housing member with a central opening that receives finger 40 when device 10 is being worn by a user. A user may supply input to device 10 by rotating button 100 in clockwise and/or counterclockwise directions 110 about rotational axis 108. A user may also supply input to device 10 by rotating angular knob (button) 102 in directions 104 about longitudinal axis relative to ring-shaped housing 44. Annular knob 102 may be formed from an annular member that is concentric with annular housing 44 of FIG. 29 and runs around the outer circumference of annular housing 44. When rotating knob 102, housing 44 of ring device 10 may remain stationary on finger 40. An elastomeric coating or other structures on inwardly facing surfaces of housing 44 adjacent to finger 40 may be used to help hold housing 44 in place when providing input using rotating annular control members such as knob 102. A user may rotate control members such as button 100 and knob 102 using fingers other than finger 40 (e.g., an index finger and thumb, only a thumb, other fingers, etc.).

During operation of system 8, information gathered using one or more ring devices 10 may be conveyed to one or more devices 24 for use in controlling devices 24 (e.g., for interacting with mixed reality and/or virtual reality content displayed with one or more displays in devices 24, for interacting with information displayed on a cellular telephone display, or a display on a watch, laptop computer, tablet computer, desktop computer, or other device 24, etc.). For example, information gathered from input devices such as button 100 and knob 102, input devices such as sensors (e.g., touch sensors, strain gauges such as force sensors, inertial management units, and/or other sensors), and/or other input devices on the main annular portion of housing 44 and/or on an expandable portion of housing 44 can be used as control signals for system 8. Information gathered using the circuitry of device 10 in the main body of housing 44 and/or expandable portion 44E can be wirelessly transmitted to one or more devices 24 using wireless communications circuitry in device 10. Devices 24 can respond accordingly (e.g., by adjusting displayed content using the received information as pointing input or other input for software running on devices 24). Information from device(s) 10 that is wirelessly transmitted to devices 24 may be used for making selections of virtual items and/or otherwise adjusting the operation of system 8). In some configurations, device 10 can adjust internal circuitry based on this gathered information. As an example, device 10 may be used as a media player and user input gathered with an input device on the main housing body in device 10 and/or the expendable housing portion in device 10 may be used to control media playback operations (e.g., streaming wireless music to paired wireless earbuds or other device 24).

The foregoing is merely illustrative and various modifications can be made to the described embodiments. The foregoing embodiments may be implemented individually or in any combination.

What is claimed is:

1. A system configured to be interacted with by a user, the system comprising:
   a wearable electronic device configured to be worn on a finger of the user, the wearable electronic device having a hinge that rotates about an axis that is parallel with a longitudinal axis of the finger of the user when the wearable electronic device is worn on the finger of the user, a visual marker, and a first sensor that gathers input from the user; and
   a head-mounted device comprising a display viewable by the user and a second sensor that is configured to detect the visual marker to track the wearable electronic device.

2. The system defined in claim 1 wherein the wearable electronic device is a ring that has a first portion and a second portion, and wherein the first portion is configured to move relative to the second portion.

3. The system defined in claim 1 wherein the head-mounted device further comprises control circuitry and wherein the control circuitry is configured to use the second sensor to track the wearable electronic device.

4. The system defined in claim 3 wherein the second sensor is a camera and wherein the control circuitry is configured to use the camera to detect the visual marker and track the wearable electronic device.

5. The system defined in claim 4 wherein the visual marker is a marker selected from the group consisting of: a retroreflector, a fiducial, and a light source.

6. The system defined in claim 3 wherein the wearable electronic device is a ring that has an expandable housing portion movable between an unexpanded configuration and an expanded configuration.

7. The system defined in claim 6 wherein the visual marker is on the expandable housing portion and viewable when the expandable housing portion is in the expanded configuration.

8. The system defined in claim 7 wherein the ring further comprises a haptic output device that is configured to supply haptic output to the user.

9. The system defined in claim 8 wherein the haptic output device is on the expandable housing portion of the ring.

10. The system defined in claim 1 wherein the head-mounted device displays virtual content overlaid on real-world objects, the head-mounted device further comprising:
    control circuitry that is configured to modify the virtual content based on the input gathered by the first sensor in the wearable electronic device.

11. The system defined in claim 10 wherein the wearable electronic device further comprises first wireless communications circuitry, wherein the head-mounted device further comprises second wireless communications circuitry, and wherein the second wireless communications circuitry is configured to receive the input from the first wireless communications circuitry.

12. A ring device that is configured to be worn on a finger of the user and to communicate with a head-mounted device, the ring device comprising:
    a housing having a hinge that rotates about an axis that is parallel to a longitudinal axis of the finger of the user when the housing is worn by the user;
    at least one sensor configured to detect input from the user; and
    wireless communications circuitry that is configured to send the input to the head-mounted device.

13. The ring device defined in claim 12 wherein the at least one sensor is a sensor selected from the group consisting of: an ultrasonic sensor, an optical sensor, an inertial measurement unit, a strain gauge, and a radio-frequency sensor.

14. The ring device defined in claim 13 wherein the head-mounted device is configured to use the input to determine a position of the finger of the user.

15. The ring device defined in claim 12 further comprising a visual marker on the housing, wherein the head-mounted device is configured to track the ring device using the visual marker.

16. The ring device defined in claim 12 wherein the hinge allows a portion of the housing to be extended.

17. A system comprising:
    a ring device worn on a finger of the user, the ring device comprising:
       a housing,
       first communications circuitry configured to send data to external devices; and
    a head-mounted device comprising:
       a display configured to generate images,
       second communications circuitry configured to receive the data from the ring device, wherein the first and second communications circuitry comprise communications circuitry that supports bidirectional communication between the ring device and the head-mounted device, and control circuitry configured to adjust the displayed images based on the received data.

18. The system defined in claim 17 wherein the ring device has a hinge that is parallel to the finger of the user when the ring device is worn by the user.

19. The system defined in claim 17 wherein the control circuitry is configured to adjust the displayed images based on at least one of a position, orientation, and motion of the finger of the user.

20. A system comprising:
 a ring device worn on a finger of the user, the ring device comprising:
  a housing,
  first communications circuitry configured to send data to external devices; and
 a head-mounted device comprising:
  a display configured to generate images,
   wherein the displayed images comprise virtual images that are overlaid on physical objects,
  second communications circuitry configured to receive the data from the ring device, wherein the first and second communications circuitry comprise communications circuitry that supports bidirectional communication between the ring device and the head-mounted device, and
  control circuitry configured to adjust the displayed images based on the received data.

* * * * *